United States Patent
Krapp

(10) Patent No.: US 8,923,319 B1
(45) Date of Patent: *Dec. 30, 2014

(54) METHOD AND SYSTEM FOR PRIORITIZING INITIAL MAINTENANCE OF CABLE MODEMS

(75) Inventor: Steven Krapp, Naperville, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 102 days.

This patent is subject to a terminal disclaimer.

(21) Appl. No.: 12/978,604

(22) Filed: Dec. 26, 2010

Related U.S. Application Data

(63) Continuation of application No. 11/046,304, filed on Jan. 28, 2005, now Pat. No. 7,860,122.

(60) Provisional application No. 60/481,959, filed on Jan. 28, 2004.

(51) Int. Cl.
*H04J 3/14* (2006.01)

(52) U.S. Cl.
USPC ............ 370/437; 370/390; 370/410; 725/111

(58) Field of Classification Search
None
See application file for complete search history.

(56) References Cited

U.S. PATENT DOCUMENTS

| | | | |
|---|---|---|---|
| 6,594,305 B1 | 7/2003 | Roeck et al. | |
| 6,940,874 B2 | 9/2005 | Ruszczyk et al. | |
| 6,944,881 B1 | 9/2005 | Vogel | |
| 6,948,184 B1 | 9/2005 | Del Sol et al. | |
| 7,089,580 B1 | 8/2006 | Vogel et al. | |
| 7,206,321 B1 | 4/2007 | Bansal et al. | |
| 7,227,889 B1 | 6/2007 | Roeck et al. | |
| 7,349,430 B1 | 3/2008 | Chapman | |
| 2001/0055319 A1 | 12/2001 | Quigley et al. | |
| 2002/0101883 A1 | 8/2002 | Ruszczyk et al. | |
| 2003/0061623 A1* | 3/2003 | Denney et al. ............... | 725/125 |

OTHER PUBLICATIONS

Harry Newton, Newton's Telecom Dictionary, 14th edition, 1988, published in the United States by Flatiron Publishing. Definition for "Multicasting," p. 459.
Firewall.CX, The Site for Networking Professionals, "Introduction to Multicast," http://www.firewall.cx/multicast-intro.php, Mar. 22, 2009, pp. 1-6.

* cited by examiner

Primary Examiner — Bob Phunkulh
(74) Attorney, Agent, or Firm — Troy A. Van Aacken

(57) ABSTRACT

A user device connected to a CMTS over a network is configured such that upon power-up it can use a universal broadcast SID or a predetermined multicast SID to obtain an initial maintenance during a maintenance window. The predetermined multicast SID is assigned to the device at manufacture based on the type, or class, of device. The CMTS to which the devices connect is configured to schedule exclusive initial maintenance opportunity windows for each type of device in addition to an all-inclusive, or open, initial maintenance opportunity window, during which all types of devices may attempt to register. The order and number of initial maintenance windows within a periodically recurring sequence of windows can be configured by an operator based on the types of devices connected to the network.

14 Claims, 1 Drawing Sheet

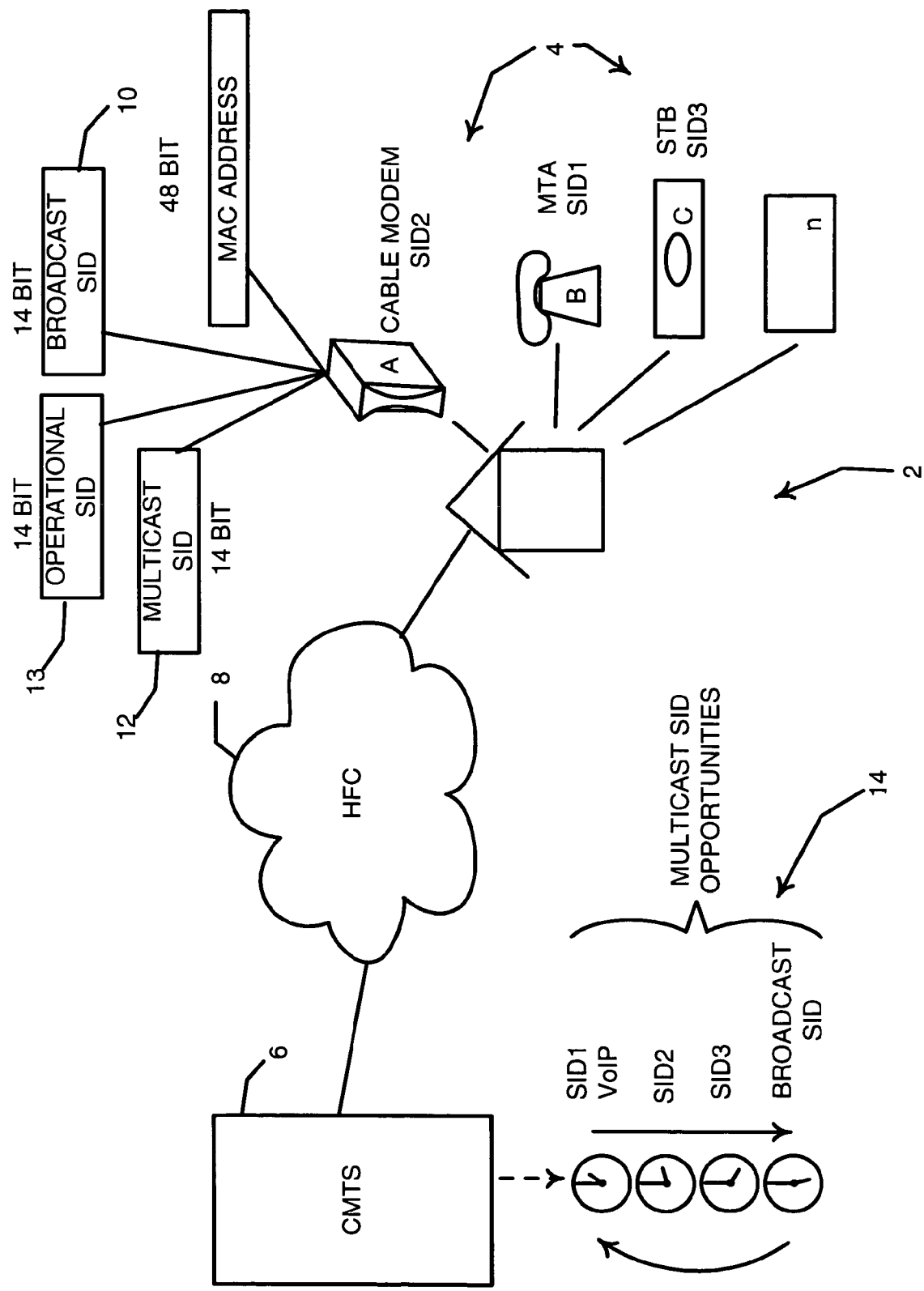

METHOD AND SYSTEM FOR PRIORITIZING INITIAL MAINTENANCE OF CABLE MODEMS

CROSS REFERENCE TO RELATED APPLICATION

This application claims priority as a continuation of U.S. Pat. No. 7,860,122, entitled "Method and System for Prioritizing Initial Maintenance of Cable Modems," issued on Dec. 28, 2010, which also claims priority as a non-provisional of U.S. Provisional Patent Application No. 60/481,959, entitled "Prioritized initial maintenance," which was filed Jan. 28, 2004, and is incorporated herein by reference in its entirety.

FIELD OF THE INVENTION

The present invention relates generally to communication devices, and more particularly to the registration process of cable modems registering with a CMTS.

BACKGROUND

Cable data systems are used to allow cable TV subscribers to use the Hybrid-Fiber-Coax network as a communication link between their home networks and the Internet. As a result, computer information (Internet Protocol packets) can be transmitted across the Hybrid-Fiber-Coax network between home computers and the Internet. The Data Over Cable Service Interface Specification ("DOCSIS") specifies a set of protocols used to effect a data transfer across the Hybrid-Fiber-Coax network. Two primary pieces of equipment facilitate this data transfer: cable modems ("CM") at the subscriber's homes or offices, and a Cable Modem Termination System ("CMTS") at the network operator's head end.

When a CM is placed into service on a network, a process of ranging and registering occurs. Communication between the CMTS and the CM initially takes place during a periodic initial maintenance window of time designated by the CMTS. The period is typically on the order of tens of milliseconds. A plurality of cable modems associated with a given CMTS media access control ("MAC") layer device may attempt to connect during an initial maintenance window using a broadcast service identifier ("SID"). The broadcast SID is conventionally a defined 14-bit number—that may be represented in hexadecimal format—that is used by all CMs attempting to register during an initial maintenance window. This broadcast SID is typically embedded into the CMs nonvolatile memory, and is preferably a standardized number under DOCSIS.

When a connection has been established between the CMTS and a CM (or other user device for connecting with a CMTS having a MAC address), the CMTS assigns a unicast SID to be used thereafter for communications from the CM that are granted by the CMTS. As the broadcast SID is not overwritten in the CM, the assigned unicast SID is stored in memory at another location within the CM. Thus, the system of CMTS and CM is configured such that the CMTS recognizes a message from a CM that contains the universal broadcast SID and the CM's MAC address, and assigns a unicast SID for device-specific communications from the CM to the CMTS. It will be appreciated that the SIDs may also be used after initial maintenance for periodic of sporadic maintenance.

This arrangement is functional, but when there are a large number of CMs that are associated with a given MAC device at the CMTS, the time it takes for all CMs to become registered with the CMTS may take longer than a few seconds, thus making use by the CM user a less-than-optimal experience. Especially when there are a large number of devices attempting to register simultaneously, such as may occur following restoration of power after a power outage, this time lag to register can be more than just an annoyance when the traffic to be carried by the communication device is voice traffic, such as a media terminal adaptor ("MTA") carrying voice over internet protocol ("VoIP"). The time delay could cause a call to be missed, or cause a user to decide not to place the call because of the delay. In the case of a set top box ("STB") used in video applications, delay in registering a device may result in delay in features and service facilitated by the STB becoming available.

Thus, there is a need in the art for a method that facilitates faster registering with a CMTS of CMs, MTAs, STBs and other devices having a MAC that are attempting to join a network.

SUMMARY

A user device, such as, for example, a cable modem ("CM"), media terminal adaptor ("MTA") or set top box ("STB"), is configured such that upon power-up, it can use a universal broadcast SID as well as a predetermined multicast SID. The predetermined multicast SID is assigned to the device at manufacture based on the type, or class, of device it is, for example, class types may include MTA, CM or STB. The CMTS to which the devices connect is configured to schedule exclusive initial maintenance opportunity windows for each type of device in addition to an all-inclusive, or open, initial maintenance opportunity window, during which all types of devices may attempt to register.

After a user device has achieved successful initial maintenance, the CMTS assigns a unicast SID to the device. This assigned unicast SID may replace the initial multicast SID that the user device may have used to obtain initial maintenance with the CMTS during one of the exclusive initial maintenance windows. Thus, after initial maintenance is complete, regardless of whether the predetermined multicast SID or the conventional broadcast SID was used for initial maintenance, the predetermined multicast SID may be replaced with the unicast SID assigned by the CMTS, and the user device and CMTS function thereafter using the unicast SID, as known in the art. However, it will be appreciated that the multicast SID may be retained at the user device and may be used to obtain subsequent maintenance with the CMTS, while also retaining the unicast SID.

BRIEF DESCRIPTION OF THE DRAWINGS

FIG. 1 illustrates a system for providing extra initial maintenance opportunities for a device based on device class.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Turning now to the FIGURE, FIG. 1 illustrates a system for providing extra initial maintenance opportunities for devices 4 based on device class. The devices typically connect to a CMTS 6 over an HFC network 8 as known in the art. When devices 4 are manufactured, they are preferably programmed by storing to non-volatile memory ("NVM") a broadcast SID 10. In addition, devices 4 are configured such that when power is first applied and they are connected to network 8, they may also use a default multicast SID 12 instead of, or in addition to, broadcast SID 10 for obtaining initial maintenance with CMTS 6. Multicast SID 12 may also be stored into NVM at manufacture.

The multicast SID 12 is preferably predetermined based on the class of the device to which it is assigned. CMTS 6 is also configured to recognize initial maintenance request from a user device 4 that is using a particular multicast SID as being a certain class of device. Thus, for example, if device 4B is an MTA, it may be configured with multicast SID1. CMTS 6 is configured to provide an exclusive initial maintenance window to only devices using SID1 in an initial maintenance request. Thus, assuming all devices 4 on network 8 are not MTAs, then there will typically be fewer contention interferences among devices trying to obtain initial maintenance during the same initial maintenance window. Accordingly, when there are fewer contention interferences, devices requesting initial maintenance are typically registered more quickly that when there are more interferences.

When a device 4 has successfully registered with CMTS 6, the CMTS assigns a unicast SID to be used by that device, and operation continues thereafter with the user device using its assigned unicast SID as known in the art. The unicast SID assigned by CMTS 8 is sent to the user device 4. Where the initial multicast SID is stored may be referred to as the operational SID 13, because it may be where the unicast SID is ultimately stored after successful registration. The user device 4 may use the multicast SID (which may initially be loaded into operational SID location 13) in addition to broadcast SID 10, which is hard-coded into the device 4 and is not overwritten. Alternatively, the broadcast SID 10 and the multicast SID 13 may be both stored in NVM and the unicast SID may be stored at operational memory location 13 within user device 4. Thus, the broadcast SID and the multicast SID would be available for obtaining maintenance during a maintenance window without losing the unicast SID.

In the FIGURE, a series of clocks is shown, each representing a time period, or window, during which an opportunity exists for using a predetermined SID to request initial maintenance. In the example, scheduling software, firmware and circuitry within CMTS 6 schedules a first opportunity in sequence 14 for requests using SID1, which in the FIGURE is associated with MTAs. Multicast SIDs may be stored in firmware, NVM, or other memory at CMTS 6 to be used to determine which device classes to grant initial requests to during a window corresponding to a given device class. As known in the art, MTAs are typically used for voice over internet protocol ("VoIP") traffic.

Next is a period scheduled for SID2, which in the FIGURE is associated with cable modem—typically internet data—traffic. SID2 is followed by a period for SID3 requests, which in the FIGURE are associated with STB traffic. Lastly, a period for all types of devices—including CMs, STBs and MTAs—requesting initial maintenance using the universal broadcast SID is shown. It will be appreciated that the order of these periods does not have to follow the order in the FIGURE.

Moreover, an operator may wish to schedule more than one period for a given type, or class, of device in a sequence. Since it may be desirable to prioritize VoIP traffic, more periods for initial maintenance requests using SID1 may be scheduled within sequence 14 than for initial maintenance intervals for other device classes. For example—not shown in the FIGURES—if sequence 14 comprised ten maintenance periods the first period could be for those initial maintenance request using a broadcast SID, the next two could be for SID1, the next could be for SID2, the next two for SID1 again, the next for SID3, the next two for SID1 again and the last for SID2 again. Then, sequence 14 would begin again with a period for request using the broadcast SID. Thus, during sequence 14, MTAs would have seven windows during which requests could be granted. This would include the window for requests using the broadcast SID, and the six other windows for requests using the MTA's SID1. It will be appreciated that the number of windows for a given device class, as well as the order of the windows corresponding to given classes can vary within sequence 14. This order and number of windows can be determined by the system operator based on the number and classes of devices that the operator has on a network. This may be thought of as a modified round-robin approach to granting initial maintenance requests based on device class.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

I claim:

1. A method for decreasing the time delay in connecting a communication device to a CMTS over a network, comprising:
receiving a plurality of multicast SIDs, the plurality of multicast SIDs defining a prioritized scheduling of initial maintenance opportunities;
storing a multicast SID from the plurality of multicast SIDs into the device in addition to a broadcast SID, wherein only devices of a given class may use a predetermined multicast SID assigned to the given class, and wherein devices of any class may use the broadcast SID, and
requesting initial maintenance with the CMTS using the multicast SID assigned to the class of the communication device.

2. The method of claim 1 further comprising requesting initial maintenance with the CMTS using the broadcast SID.

3. The method of claim 1 further comprising:
assigning a unicast SID after successfully performing initial maintenance; and
replacing the multicast SID with the assigned unicast SID.

4. The method of claim 1 wherein the multicast SID is assigned to the device based on the class of the device.

5. A method for decreasing the time delay in connecting a communication device to a CMTS over a network, comprising:
scheduling initial maintenance opportunities for each of a plurality of device classes, wherein only the devices of a given class may use a predetermined multicast SID assigned to the given class, or individual devices may use a respective unicast SID assigned to a particular device for requesting initial maintenance, wherein the plurality of device classes each comprise multiple devices and the plurality of device classes are prioritized to provide priority among devices in particular classes for requesting initial maintenance opportunities.

6. The method of claim 5 further comprising scheduling general initial maintenance opportunities for all devices wherein all devices may use a broadcast SID for requesting initial maintenance.

7. The method of claim 5 further comprising assigning a unicast SID to a given device after said device has successfully registered with the CMTS, the unicast SID to overwrite a predetermined multicast SID currently stored in said device.

8. The method of claim 5 wherein the predetermined multicast SID is determined based on the class of device to which it is to be assigned.

9. The method of claim 5 wherein the scheduled initial maintenance opportunities periodically recur as part of a periodically recurring initial maintenance sequence.

10. A system for decreasing the time delay in connecting a communication device to a CMTS over a network, comprising:

means for scheduling initial maintenance opportunities for each of a plurality of device classes, wherein only the devices of a given class may use a predetermined multicast SID associated with the given class for requesting initial maintenance; and means for receiving request for initial maintenance opportunities for each of a plurality of device classes based upon the predetermined multicast SID associated with each of the plurality of device classes, wherein the devices classes each comprise multiple devices and the plurality of device classes are prioritized to provide priority among devices in various classes for requesting initial maintenance opportunities.

11. The system of claim 10 further comprising means for scheduling general initial maintenance opportunities for all devices wherein all devices may use a broadcast SID for requesting initial maintenance.

12. The system of claim 10 further comprising means for assigning a unicast SID to a given device after said device has successfully registered with the CMTS, the unicast SID to overwrite a predetermined multicast SID currently stored in said device.

13. The system of claim 10 wherein the predetermined multicast SID is determined based on the class of device to which it is to be assigned.

14. The system of claim 10 wherein the scheduled initial maintenance opportunities periodically recur as part of a periodically recurring initial maintenance sequence.

* * * * *